(12) United States Patent
Sanches et al.

(10) Patent No.: US 6,944,748 B2
(45) Date of Patent: Sep. 13, 2005

(54) SIGNAL PROCESSOR EXECUTING VARIABLE SIZE INSTRUCTIONS USING PARALLEL MEMORY BANKS THAT DO NOT INCLUDE ANY NO-OPERATION TYPE CODES, AND CORRESPONDING METHOD

(75) Inventors: José Sanches, Meylan (FR); Marco Cornero, Arlington, MA (US); Miguel Santana, Revel (FR); Philippe Guillaume, Saint Egreve (FR); Jean-Marc Daveau, Grenoble (FR); Thierry Lepley, Grenoble (FR); Pierre Paulin, Saint Vincent de Mercuze (FR); Michel Harrand, Saint Egreve (FR)

(73) Assignee: STMicroelectronics SA, Montrouge (FR)

(*) Notice: Subject to any disclaimer, the term of this patent is extended or adjusted under 35 U.S.C. 154(b) by 594 days.

(21) Appl. No.: 09/915,761

(22) Filed: Jul. 26, 2001

(65) Prior Publication Data

US 2002/0116596 A1 Aug. 22, 2002

(30) Foreign Application Priority Data

Jul. 27, 2000 (FR) .......................................... 00 09882

(51) Int. Cl.[7] .............................................. G06F 15/00
(52) U.S. Cl. ...................................... 712/204; 711/157
(58) Field of Search ...................... 711/5, 157; 712/24, 712/204

(56) References Cited

U.S. PATENT DOCUMENTS

| | | | |
|---|---|---|---|
| 5,740,402 A | * | 4/1998 | Bratt et al. ................. 711/157 |
| 5,787,302 A | * | 7/1998 | Hampapuram et al. ....... 712/24 |
| 5,806,082 A | | 9/1998 | Shaw ......................... 711/104 |
| 5,930,508 A | * | 7/1999 | Faraboschi et al. ......... 717/158 |
| 6,480,938 B2 | * | 11/2002 | Vondran, Jr. ................. 711/125 |

FOREIGN PATENT DOCUMENTS

| | | | |
|---|---|---|---|
| EP | 0473420 | 3/1992 | ............. G06F/9/38 |
| EP | 0855648 | 7/1998 | ............. G06F/9/38 |

OTHER PUBLICATIONS

Hennessy, John L. and Patterson, David A. "Computer Architecture A Quantitaive Approach". Second Edition. San Francisci, CA: Morgan Kaufmann Publishers, Inc., ©1996. pp. 430–434.*

"Webster's Ninth New Collegiate Dictionary". Springfield, Mass.: Merriam–Webster, Inc., ©1990. pp. 995–996, terms "Remainder" and "Remainder Theorem".*

InstantWeb. "Online Computing Dictionary". http://www.instantweb.com/foldoc/foldoc.cgi?computer+dictionary Search Term: modulo operator.*

* cited by examiner

*Primary Examiner*—Eddie Chan
*Assistant Examiner*—Aimee Li
(74) *Attorney, Agent, or Firm*—Lisa K. Jorgenson; Allen, Dyer, Doppelt, Milbrath & Gilchrist, P.A.

(57) ABSTRACT

A digital signal processor is designed to execute variable-sized instructions that may include up to N elementary instruction codes. The processor comprises a memory program comprising I individually addressable, parallel-connected memory banks in which the codes of a program are recorded in an interlaced fashion, and a circuit for reading the program memory arranged to read a code in each of the I memory banks during a cycle for reading an instruction. A cycle for reading an instruction in the program memory includes reading a sequence of codes that includes the instruction code or codes to be read and can also include codes, belonging to a following instruction, that are filtered before the instruction is applied to execution units. The program memory of the digital signal processor does not include any no-operation type codes.

28 Claims, 3 Drawing Sheets

SIGNAL PROCESSOR EXECUTING VARIABLE SIZE INSTRUCTIONS USING PARALLEL MEMORY BANKS THAT DO NOT INCLUDE ANY NO-OPERATION TYPE CODES, AND CORRESPONDING METHOD

FIELD OF THE INVENTION

The present invention relates to digital signal processors (DSPs), and more particularly, to a DSP with a parallel architecture or a VLIW (very large instruction word) processor.

BACKGROUND OF THE INVENTION

As is well known to those skilled in the art, VLIW type processors are processors derived from RISC (reduced instruction set computer) processors which differ from conventional DSPs in that they comprise several parallel-mounted execution units. Each execution unit is the equivalent of a RISC processor core and executes instruction codes in reduced format, generally 16-bit codes, by exploiting the resources offered by a bank of registers. Since each execution unit is capable of carrying out an instruction code simultaneously with the other execution units, the VLIW processors are therefore capable of simultaneously executing a large instruction comprising several RISC equivalent codes in parallel.

Figure 1:
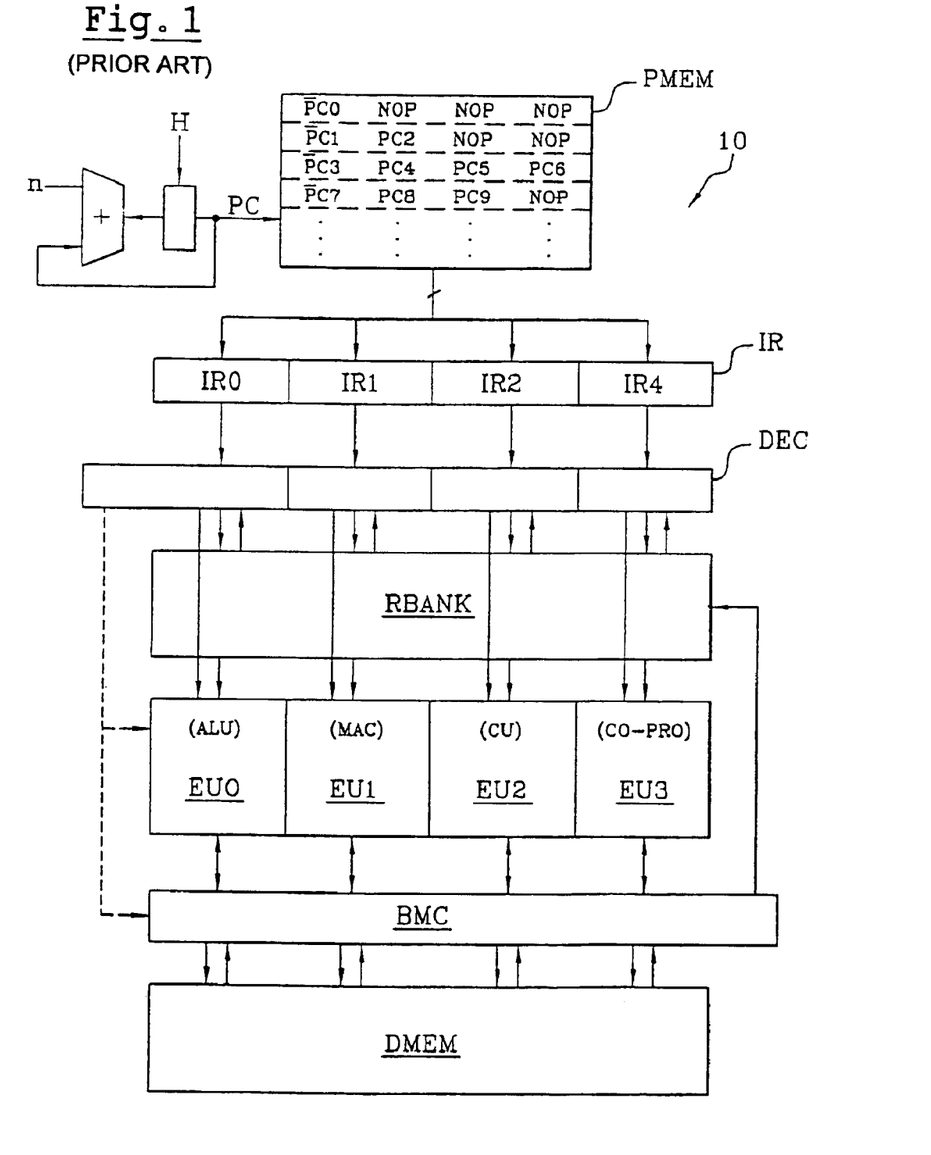
FIG. 1, is a block diagram of the architecture of a standard VLIW processor, according to the prior art.

To give a better understanding, FIG. 1 presents a schematic view of the standard structure of a VLIW type processor 10 whose essential elements are shown in block form. The processor 10 comprises a program memory PMEM, a data memory DMEM, an instruction register IR positioned at the output of the memory PMEM, an instruction decoder IDEC positioned at the output of the register IR, a bank of registers REGBANK designed to execute the RISC type instruction codes, execution units EU0 to EU3, as well as a circuit BMC forming the interface between the execution units UE1–EU3 and the inputs/outputs of the data memory DMEM. The execution units, which herein are four units EU0, EU1, EU2, EU3, are parallel-connected to simultaneously process four instruction codes that are read simultaneously in the memory PMEM, together forming a large instruction. The nature of the execution units may vary as a function of the application for which the processor is designed. The execution units comprise for example an ALU (arithmetic and logic unit), a MAC (multiplication/addition) unit, a CU (control unit managing the program counter PC and the connections), and a CO-PRO (coprocessor) unit to perform certain computations specific to the application.

A processor of this kind is thus capable of executing large instructions which herein includes at most four codes. At each new clock cycle H, the program counter PC of the processor is increased by an increment n which is equal to 1, except in the case of a jump or a call, and the instruction registers IR0–IR3 receive four new codes simultaneously and in parallel. These four new codes are to be executed by the units EU0–EU3.

The architecture of a processor 10 of this kind thus differs from a conventional RISC processor by its parallelism which can be found at all stages in the processing of the instructions. However, the possibilities offered by this parallelism are rarely exploited, and the compiled programs stored in the program memory PMEM generally comprise a large number of no-operation or NOP codes. Indeed, the conversion of a program written in a high-level language, for example the language C/C++, into a sequence of RISC type codes combined in bundles is done automatically by a compilation program that knows the structure of the processor and tries to form bundles of the largest possible size (with a maximum of four codes in the exemplary processor being described) to exploit the parallelism of the processor. This optimization is done by taking account of the conflicts between the codes, the availability of the execution units and the data dependence during the pipeline execution of the codes. Thus, for example, two codes designed to be executed by the same execution unit cannot be executed in parallel in the same bundle. Equally, a code using an operand that is the result of an operation that is object of another code cannot be executed so long as the code on which it depends is not itself executed.

For example, let us consider the following program sequence:

| /p c0 | /p c1 | p c2 | /p c3 | p c4 | p c5 | p c6 | /p c7 | p c8 | p c9 |
|---|---|---|---|---|---|---|---|---|---| which comprises instruction codes c0 to c9 comprising a parallelism bit /p or p. The instruction codes, known to those skilled in the art as syllables, are put together in bundles to form large instructions. The separation of the instructions (bundles) within a program is done by the parallelism bits p assigned to each of the codes. The two possible values /p or p of a parallelism bit, for example 0 and 1, tells whether or not the code belongs to a new instruction. More particularly, a code preceded by a parallelism bit p (for example 1) belongs to the same instruction as the previous code, while a code preceded by a parallelism bit /p (for example 0) belongs by convention to a new bundle.

In the program sequence mentioned above, the parallelism bits are thus used to distinguish four large instructions INST1 to INST4:
INST1=c0
INST2=c1 c2
INST3=c3 c4 c5 c6
INST4=c7 c8 c9

So that they can be executed by the processor 10, these instructions INST1 to INST4 are recorded in the program memory PMEM of the processor as shown in FIG. 1 and described in the following Table 1:

TABLE 1

| /p c0 | NOP | NOP | NOP |
|---|---|---|---|
| /p c1 | NOP | NOP | NOP |
| /p c3 | p c4 | p c5 | p c6 |
| /p c7 | p c8 | p c9 | NOP |

Consequently, the compilers for standard VLIW processors generate a large number of no-operation codes for keeping certain execution units inactive while others execute codes. This may result in the program memory becoming over-burdened with 20% to 70% of the memory space being taken up, depending on the efficiency of the compiler and the matching between the program to be compiled and the resources offered by the processor. This over-burdening of the memory space by NOP codes, which is considerable in relation to the instruction programs really needed for the execution of the programs, increases the surface of the memory PMEM for a given application. This therefore causes a drop in performance (the memory is slower with the increase in size), additional consumption (the word lines and bit lines are longer in the memory array) and costs (in terms of silicon surface area).

SUMMARY OF THE INVENTION

In view of the foregoing background, an object of the present invention is to overcome the above described drawbacks. More particularly, the object of the present invention is to provide a VLIW type processor capable of receiving, in its program memory, bundles of codes that do not comprise any no-operation codes.

These objects, features and advantages are provided by a signal processor designed to execute variable-sized instructions that may comprise up to N elementary instruction codes. The processor comprises a memory program comprising I individually addressable, parallel-connected memory banks, with I being at least equal to N, and wherein the codes of a program are recorded in an interlaced fashion at the rate of one code per bank and per address applied to the bank. The processor further comprises means for reading the program memory arranged to read a code in each of the I memory banks during a cycle for reading an instruction. A cycle for reading an instruction in the program memory comprises reading a sequence of codes that comprises the instruction code or codes to be read and can also, when the number of codes of the instruction read is smaller than I, comprise codes belonging to a following instruction.

According to one embodiment, the read means comprises means for the application, to the memory banks, of the individual addresses generated from a collective value of a program counter that is incremented by a value equal to the number of codes comprising the previous instruction before the beginning of a cycle for reading an instruction.

According to another embodiment, the means to apply addresses apply, to each of the memory banks, an individual read address equal to P0 or P0+1, with P0 being the quotient of the division by I of the value of the program counter.

According to another embodiment, the means for applying the addresses applies to an i ranking memory bank an address equal to P0 when i is strictly greater than R, or for the applying to an i ranking memory bank an address equal to P0+1 when i less than or equal to R, with R being the remainder of the division by I of the value of the program counter.

According to yet another embodiment, the read means comprises means for reorganizing the codes of the sequence of codes read in the program memory, according to the following algorithm: c'(j)=c(i), with i=(j+R')modulo I, in which i and j designate the ranks of the codes before and after reorganization, c(i) designates i ranking codes in their arrangement after reading in the memory, c'(j) designates j ranking codes after reorganization, and R' is the remainder of the division by I of the value that was shown by the program counter during the previous clock cycle.

According to another embodiment, the means for reorganizing are arranged for the application to the sequence of codes read in the program memory of a circular permutation comprising a number of elementary circular permutations equal to R' or to I–R' depending on the direction in which the circular permutation is made.

According to yet another embodiment, the circular permutations are performed by a barrel shifter receiving the parameter R' at a control input.

Advantageously, the read means comprises means to filter the codes that do not belong to the instruction to be read, using parallelism bits accompanying the codes.

According to another embodiment, the filtered codes are replaced by no-operation codes.

According to one embodiment, the code-filtering means are arranged to execute the following algorithm:

For j=0, val(j=0)=v, s(j=0)=c'(j=0); For j going from 1 to I, val(j)=v if val(j−1)=v and if parallelism bit of c'(j)=p, else val(j−1)=/v; s(j)=c'(j) if val(j)=v; s(j)=NOP if val(j)=/v, in which val(j) is a validation term associated with each j ranking code, c'(j) is capable of having two values v and /v, s(j) designates j ranking outputs of the filtering means corresponding to same ranking inputs receiving a code c'(j), and NOP is a no-operation code.

According to another embodiment, the non-filtered codes are sent to parallel-mounted RISC type execution units.

The present invention also relates to a method for the reading of variable-sized instructions that may include up to N elementary instruction codes, applicable to a signal processor. The method comprises the steps of providing for a program memory comprising I individually addressable parallel-connected memory banks, with I being at least equal to N. The method further includes recording the codes of a program in the program memory in interlaced fashion, at a rate of one code per bank and per address applied to the bank. During a read cycle of an instruction, the method includes reading a sequence of codes in the I memory banks. The sequence comprises the code or codes of the instruction to be read and possibly also comprises, when the number of instructions codes read is smaller than I, the codes belonging to a following instruction.

According to yet another embodiment, the method comprises the application, to the memory banks, of the individual addresses generated from a collective value of a program counter, that is incremented by a value equal to the number of codes contained in the previous instruction before the beginning of a cycle for reading an instruction.

According to another embodiment, the method comprises the application, to each to the memory banks, of an individual read address equal to P0 or P0+1, with P0 being the quotient of the division by I of the value of the program counter. An i ranking memory bank receives an address equal to P0 when i is strictly greater than R or an address equal to P0+1 when i is smaller than or equal to R, with R being the remainder of the division by I of the value of the program counter.

According to another embodiment, the method comprises the reorganization of the codes of the sequence of codes read in the program memory, according to the algorithm mentioned above.

According to yet another embodiment, the method comprises a step of filtering the codes read, that do not belong to the instruction to be read, using parallelism bits accompanying the codes.

According to another embodiment, filtered codes are replaced by no-operation codes.

According to another embodiment, the codes are filtered according to the algorithm mentioned above.

According to yet a further embodiment, the non-filtered codes are sent to parallel-connected RISC type execution units.

BRIEF DESCRIPTION OF THE DRAWINGS

These objects, features and advantages as well as others of the present invention shall be explained in greater detail in the following description of an exemplary embodiment of a processor according to the invention, given by way of a non-restrictive description with reference to the appended figures, of which.

DETAILED DESCRIPTION OF THE PREFERRED EMBODIMENTS

Figure 2:
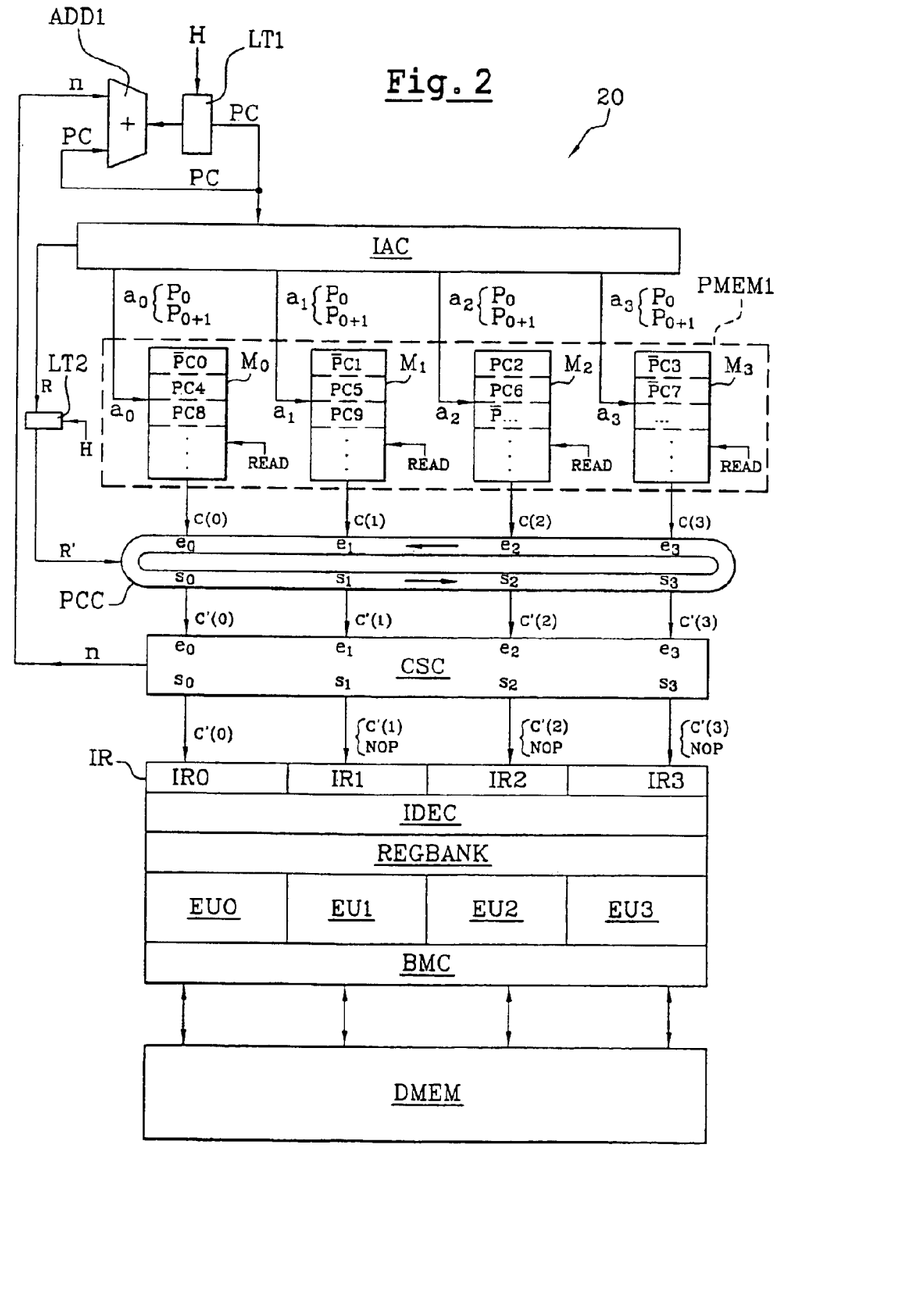
FIG. 2 is a block diagram of the blocks of the architecture of a processor according to the present invention.

FIG. 2 is a schematic view of the architecture of a signal processor 20 according to the invention. The processor 20, like the standard processor of FIG. 1, has a program memory PMEM1, a data memory DMEM, an instruction register IR, an instruction decoder IDEC positioned at the output of the register IR, a register bank RBANK, execution units, in this case four units EU0 to EU3. The processor 20 further includes a BMC (built-in self-test/mapping/conflicts) circuit designed to read or write data elements in the data memory DMEM or in the register bank RBANK, and to fulfil various other functions such as the built-in self-test (BIST) function and the management of address conflicts. The instruction register IR comprises four parallel-connected registers IR0 to IR3 designed for the reception, at each instruction reading cycle (or fetch cycle), of four instruction codes c'(0) to c'(3) delivered by the program memory PMEM1. The instruction decoder IDEC decodes the codes c'(0)–c'(3) as well as distributes the operands to the execution units concerned. These elements are standard and form the core of the processor schematically shown in block form.

The processor 20 according to the invention differs from a standard processor in that the program memory PMEM1 includes several parallel-connected memory banks, in this case four individually addressable banks M0, M1, M2, M3 that respectively receive addresses a0, a1, a2, a3. Hereinafter, the reference I designates the number of individually addressable memory banks present in a processor according to the invention, N designates the maximum number of instruction codes that may be contained in a large instruction (bundle) and, I is at least equal to N. In the illustrated example, I is equal to N which is equal to 4 since the processor comprises four execution units.

According to the invention, the instruction codes (syllables) of a program are recorded in a memory PMEM1 in an interlaced fashion, in such a way that two codes succeeding each other in the program are arranged in two contiguous memory banks of increasing rank with the same address $a_i$ in each bank. When a code is registered in the last memory bank M3, at an address a3=x, the next code is registered in the memory bank M0 at the address a0=x+1, and the following codes are registered in the banks M1, M2, M3 at the addresses a1=a2=a3=x+1, etc.

To provide a better illustration of the present invention, we shall assume that the following program of sequences, already described in the introduction, is stored in the virtual memory PMEM1:

INST1=c0
INST2=c1 c2
INST3=c3 c4 c5 c6
INST4=c7 c8 c9

Unlike a standard processor, the codes forming the large instructions INST1 to INST4 are recorded in the memory banks one after the other without any injection of no-operation codes NOP as can be seen in the Table 2 below. The separation of the instructions is provided exclusively by the parallelism bits.

TABLE 2

| Addresses | Bank M0 | Bank M1 | Bank M2 | Bank M3 |
|---|---|---|---|---|
| X     | /p c0 | /p c1 | p c2  | /p c3 |
| x + 1 | p c4  | p c5  | p c6  | /p c7 |
| x + 2 | p c8  | p c9  | /p ... | ...  |

It may be noted here that the parallelism bits are represented herein as elements external to the codes c0 to c9 to facilitate the understanding of the invention. In practice, the parallelism bits form an integral part of the codes stored in the memory and are eliminated at the time of the execution of the codes. For example, the codes c0–c9 comprise 16 bits, among which one bit is used as a parallelism bit.

Thus, advantageously, the processor according to the invention receives compact programs that do not comprise any NOP codes. The result thereof is a substantial reduction of the amount of memory space required. This results in a reduction of the surface area needed for the storage of the program and a reduction of consumption.

A description shall now be given for reading the memory PMEM1, designed to disinterlace the instruction codes in order to extract therefrom the large instructions or bundles, comprising several codes or syllables designed to be executed simultaneously.

According to the invention, these read means essentially comprise an address management circuit IAC, a code permutation circuit PCC, and a code selection circuit CSC and includes a special mode of management for the program counter PC of the processor 20 which shall be described first.

The program counter PC is incremented conventionally at each clock cycle, for example by an adder ADD1 receiving the current value of the program counter at one input and an increment n at another input. The output of the adder is applied to a buffer LT1 driven by the clock signal H. According to the invention, the program counter PC is incremented by a value n which is not constant as in the prior art. The increment n is equal to the number of executable instruction codes contained in the previous instruction and is delivered by the circuit CSC described below.

This rule of incrementation of the program counter relates naturally to the sequential reading of the instructions of a program and cannot be applied during the execution of special instructions such as jump or call instructions for which the jump increment or the call value is dictated by the program.

The address management circuit IAC computes the individual addresses a0–a3 applied to the memory banks from the current value of the program counter PC, incremented in the manner that has just been described. More particularly, the circuit IAC computes the addresses a0–a3 by applying the following algorithm A1:

A1: for i ranging from 0 to I–1, $a_i = P0+1$ if $i<R$ $a_i = P0$ if $i=R$ where:
1) i is the index designating the rank of the memory banks M0–M3 and the rank of the corresponding addresses a0–a3;
2) P0 is the quotient of the division by I of the program counter PC, giving:

$P0 = \text{Quotient } (PC/I)$ namely in this case I is equal to 4:

P0=Quotient (PC/4)

3) R is the remainder of the division by I of the program counter PC, giving:

R=PC−P0=PC modulo I, namely, in this case, I is equal to 4:

R=PC modulo 4

Examples of the implementation of this algorithm as well as an exemplary embodiment of the circuit IAC shall be described further below. The code permutation circuit PCC is connected to the output of a program memory PMEM1 and comprises inputs e0 to e3 respectively connected to the outputs of the memory banks M0 to M3 and respectively receives codes c(0), c(1), c(2), c(3) read in the memory program. The circuit PCC also comprises four outputs s0, s1, s2, s3 respectively delivering codes c'(0), c'(1), c'(2), c'(3). The codes delivered are equal to the codes received at input but are reorganized by the circuit PCC according to the following algorithm A2:

A2: for i ranging from 0 to −1 and j ranging from 0 to −1 c'(j)=c(i), with i=(j+R')modulo I in which:
1) i is the index, herein designating the rank of the input codes c(0)–c(3) delivered by the memory banks M0–M3,
2) j is an index designating the rank of the output code c'(0)–c'(3); and
3) R' is the remainder of the division by I of the program counter PC, computed at the previous clock cycle.

As shown in FIG. 2, the circuit PCC may be made by a conventional type barrel shifter. The algorithm A2 is implemented by the application to the control input of the barrel by a buffer LT2, of the parameter R computed and delivered by the circuit IAC. Since the buffer LT2 is driven by the clock signal, the parameter R that is applied to the barrel shifter after each leading edge of the clock signal is shifted by a clock signal with reference to the parameter R of the cycle in progress, and is therefore equal to the parameter R'. The barrel shifter PCC is positioned to shift its outputs in relation to its inputs by leftward circular permutation (in the direction going from the most significant values to the least significant values), and by performing a number of leftward shifts equal to R'. In one alternative embodiment, the barrel shifter receives at its control input the complement of R' at I, namely the value [I−R'], and is laid out so as to shift its outputs in relation to its inputs by rightward circular permutation (in the direction going from the least significant values to the most significant values) by performing a number of rightward shifts equal to [I−R'].

The code-selection circuit CSC mentioned above is connected at its input to the output of the circuit PCC and comprises inputs e0 to e3 respectively receiving the codes c'(0) to c'(3). The circuit CSC also comprises four outputs s0 to s3 that copy the code received at the same ranking input in conditions set by the following algorithm A3:

A3: for j=0 val(j=0)=v s(j=0)=c'(j=0)

for j ranging from 1 to I val(j)=v if val(j−1)=v and if parallelism bit of c'(j)=p else val(j−1)=/v s(j)=c'(j) if val(j)=v, s(j)=NOP if val(j)=/v where val(j) is a daisy chain type of recursive validation term associated with each j ranking output s(j) that can have two values v and /v, for example 1 and 0. For the j ranking outputs ranging from 1 to I, this term can be used to determine whether an output s(j) must copy the code c'(j) received at the corresponding ranking input or, on the contrary, deliver a NOP code. This choice is a function of the value of the validation term val(j) which itself is a function of the value of the preceding validation term val(j−1) and of the value p or /p, for example 1 or 0, of the parallelism bit present in the code c'(j).

In other words, assigning, by convention, the value 1 to p and v and the value 0 to /p and /v, the output s0 copies the code c'(0) received at the input e0 and each of the other outputs s(j) copies the code c'(j) received at the corresponding input e(j) if the code c'(j) comprises a parallelism bit equal to 1, and if the validation bit val(j−1) of the previous ranking output is also equal to 1. When the parallelism bit of a code c'(j) is equal to 0, the corresponding output s(j) and all the following outputs deliver a NOP code.

The system for reading the program memory PMEM1 thus works as follows:

Step E1: during a first clock cycle, the circuit IAC applies addresses a0–a3 to the memory banks M0–M3, providing for the reading of four instruction codes a(0)–a(3) which follow each other in the memory PMEM1 according to the interlacing described above.

Step E2-1: during the following clock cycle, a read signal READ is applied to the memory banks and the codes are read in an order which, because of their interlacing, cannot correspond to their effective rank planned in the program. They are rearranged in order by the circuit PCC applying the algorithm A2 by the parameter R' computed in a previous clock cycle (where the addresses a0–a3 were prepared).

Step E2-2: during the same clock cycles, the selection circuit CSC identifies the codes that do not correspond to the instruction to be executed, by means of their parallelism bit /p and replaces them with no–operation codes NOP.

Step E2-3: during the same clock cycle, the instructions register IR0 receives the code c'(0) and the registers IR1–IR3 receive the filtered codes (NOP) or non-filtered codes depending on the selection made by the circuit CSC.

Step E3 and the following steps: the non-filtered codes are decoded by the decoder IDEC and executed by the units EU0–EU4.

Thus, the reading of a large instruction is done in two clock cycles as in the prior art, and comprises a cycle for preparing the addresses a0–a3 and a cycle for the reading of the codes. The codes read are reorganized and filtered during the read cycle. The operation is transparent for the operation of the entire processor. These steps are performed with overlapping, according to the standard rules of pipeline operation. For the sake of simplicity, the pipeline registers have not been described or shown.

Table 3 shown in the appendix is an integral part of the description and illustrates the operation of the processor for the reading of the instructions INST1 to INST4 described above. The parameters PC, R, R' and P0 that come into play in the execution of the algorithms are mentioned in the first columns. It is considered in this example that the codes of the instructions INST1 to INST3 are stored in the program memory PMEM1 from the address 0, and that the program counter is equal to 0 at the beginning of the read process. The columns a0–a3 give the values of the addresses computed from the current value of the program counter PC. The columns c'(0)–c'(3) give the values of the codes read in the memory in the order in which they are. The columns c'(0) c'(3) give the values of the codes after reorganization by the circuit PCC. The last four columns c'(0)–c'(3) give the values of the codes after filtering in the circuit CSC.

If we observe the last four columns of Table 3, it can be seen that the codes therein are equivalent in arrangement and in value to the codes that were in the memory of the standard processor described in the introduction (see Table 1). Thus, the reading system according to the invention reconstitutes the NOP codes which, in the prior art, were recorded in the program memory.

In general, the making of the circuits IAC and CSC is within the scope of those skilled in the art, especially through techniques for the automatic designing of logic circuits using VHDL language. The algorithms Al and A3 are expressed in VHDL language and the circuits IAC and CSC are automatically generated by a VHDL language compiler in the form of wired logic circuits. A non-restrictive description shall nevertheless be given, with reference to FIGS. 3 and 4, of exemplary embodiments of the circuits IAC and CSC in the case where the parameters I and N are equal to 4.

Figure 3:
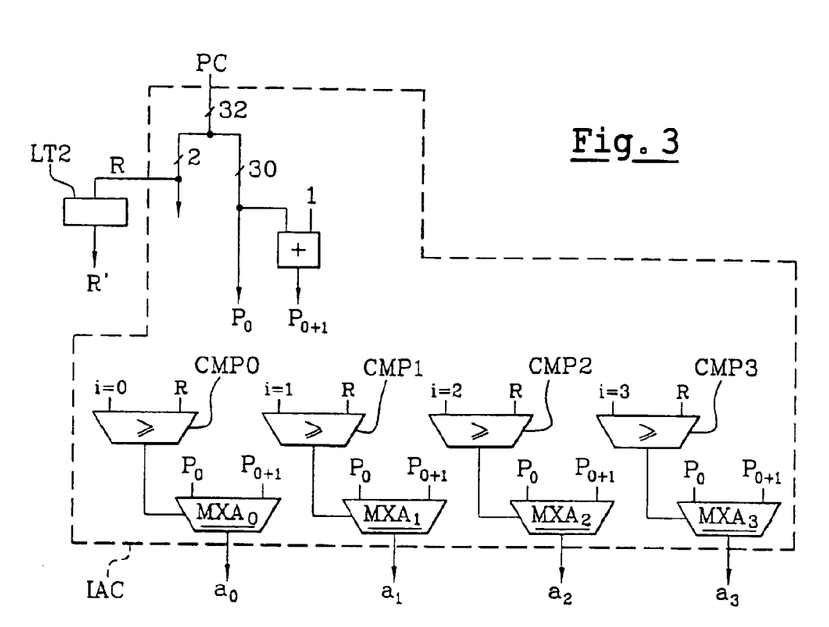
FIGS. 3 and 4 respectively illustrate detailed embodiments of selected elements represented in FIG. 2.

In FIG. 3, the circuit IAC receives the value of a program counter PC at input. This value is encoded on 32 bits. The result R is obtained simply by separating the two LSB wires of the physical line conveying the value of the program counter PC, with R being equal to the two LSBs of the program counter. Similarly, P0 is equal to the 30 MSBs of the program counter and is obtained by separating the 30 MSB wires. The parameter P0+1 is computed by an adder receiving the values P0 and 1 at input. The addresses a0–a3 are delivered by multiplexers MXA1–MXA3 receiving the parameters P0 and P0+1 at input. These multiplexers are driven by comparators CMP0–CMP3 receiving the index i at a first input and the parameter R at a second input.

Figure 4:
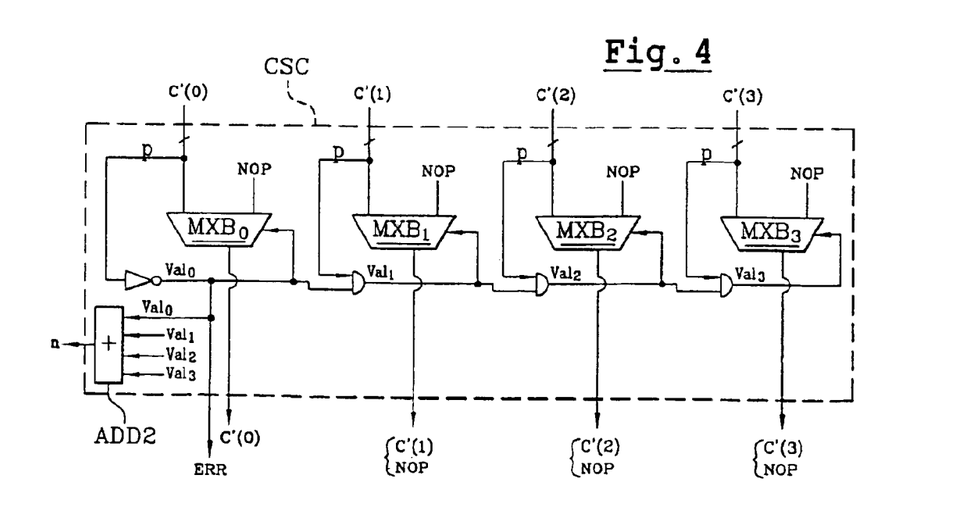

In FIG. 4, the circuit CSC is made by four multiplexers MXB0–MXB3 each receiving a code c'(j) at a first input and an NOP code at a second input. Each multiplexer is driven by a validation signal val0, val1, val2, val3 whose value determines the selection of the code c'(j) or the NOP code at output of the multiplexer. The validation codes are generated by a cascade of AND gates forming a daisy chain type of chain. Each AND gate receives, at input the validation signal for the previous code and the parallelism bit of the code received by the multiplexer to which it is related. Thus, the presence of a parallelism bit at 0 in a code c'(j) causes all the following validation signals to change over so that the concerned code and all the following codes are replaced by NOP codes.

The validation signal val(0) of the first code c'(0) is generated by an inverter gate because the parallelism bit of the first code, in principle, is always equal to 0 (/p). The multiplexer MUXB0 and the selection signal val0 of the first code c'(0) are, in principle, unnecessary since the first code c'(0) is, in principle, never filtered, and is a large instruction comprising at least one instruction code. However, the designing of this multiplexer is used to detect a possible defect in the reading of the program memory or a malfunction of the shift circuit PCC which appears when the parallelism bit of the first code c'(0) is different from 0. In this case, the validation signal val0 may be used as an error signal ERR.

The circuit CSC also comprises an adder ADD2 receiving the four validation signals val0 to val3 at input. The output of this adder delivers the value n which is applied to the adder ADD1 for the incrementation of the program counter (FIG. 2). The increment n is thus equal to the number of enabling signals equal to 1 and consequently represents the number of instruction codes that have not been filtered, namely the effective number of codes included in the large instruction that has just been read.

The present invention is, of course, open to several variations and embodiments. In particular, it is possible, in practice, to consider incorporating the filtering circuit CSC into the instruction decoder IDEC. Indeed, the function of this circuit is to ensure that codes not belonging to an instruction to be executed will not be sent to the execution units EU0–EU3. The filtering of the undesirable codes may thus be done downline from the instruction register IDEC by the decoder IDEC itself. In general, the positioning of the circuit CSC in the pipeline stages is dictated by the timing constraints relating to access to the memory PMEM1 and by the decoding times in the decoder IDEC, and come within the scope of those skilled in the art.

It will be clearly seen by those skilled in the art that the present invention provides a wide degree of liberty in the designing of a VLIW type processor. It is especially possible, as indicated above, to design a processor having a number I of memory banks and a number N of execution units where the number I is different from the number N. It is also possible to make a dynamic choice of the number N of active execution units, depending on the application planned, by inhibiting certain execution units to limit the current consumption. This inhibition of certain execution units may be designed to be programmable. The architecture of a processor according to the invention of this kind is not permanently fixed, like that of a standard VLIW processor. This is due to the elimination of the obligation to read N instruction codes en bloc and the obligation resulting therefrom to inject NOP codes into a program when an instruction contains fewer than N codes. The present invention offers a wide range in the designing of a new type of processor reconciling the requirements of low consumption and compactness in terms of silicon surface area, and providing high performance characteristics through a high degree of parallelism.

APPENDIX

Reminders:

I=4; N=4

P0=Quotient PC/I

R=PC[modulo I]

R'=R of the previous clock cycle $a_i$=P0+1 if i<R, else $a_i$=P0 c'(j)=c(i), with i=(j+R')[modulo I]

TABLE 3

Reading of instructions INST1 to INST3 in memory banks of M0 to M3

| Cycle | PC | R | R' | P0 | (Addressing of banks M1–M3) | | | | (Outputs of banks M1–M3) | | | | (PCC circuit outputs) | | | | (CSC circuit outputs) | | | |
|---|---|---|---|---|---|---|---|---|---|---|---|---|---|---|---|---|---|---|---|---|
| | | | | | a0 | a1 | a2 | a3 | c (0) | c (1) | c (2) | c (3) | c' (0) | c' (1) | c' (2) | c' (3) | c' (0) | c' (1) | c' (2) | c' (3) |
| 1 | 0 | 0 | — | 0 | 0 | 0 | 0 | 0 | — | — | — | — | | | | | | | | |
| 2 | 1 | 1 | 0 | 0 | 1 | 0 | 0 | 0 | c0 | c1 | c2 | c3 | c0 | c1 | c2 | c3 | c0 | NOP | NOP | NOP |
| 3 | 3 | 3 | 1 | 0 | 1 | 1 | 1 | 0 | c4 | c1 | c2 | c3 | c1 | c2 | c3 | c4 | c1 | c2 | NOP | NOP |
| 4 | 7 | 3 | 3 | 1 | 2 | 2 | 2 | 1 | c4 | c5 | c6 | c3 | c3 | c4 | c5 | c6 | c3 | c4 | c5 | c6 |
| 5 | 8 | 0 | 3 | 2 | | | | | c8 | c9 | ... | c7 | c7 | c8 | c9 | ... | c7 | c8 | c9 | NOP |

That which is claimed is:

1. A signal processor for executing variable-sized instructions, each instruction comprising up to N codes with N being a positive integer greater than 1, the signal processor comprising:
   a program memory comprising I individually addressable, parallel-connected memory banks with I being a positive integer at least equal to N, said program memory comprising a program recorded in an interlaced fashion as a function of one code per memory bank and per address applied to said memory banks; and
   reading means for reading said program memory by reading a code in each of said I memory banks during a cycle for reading an instruction, with each instruction comprising a sequence of codes to be read and when a number of the sequence of codes of the instruction being read is less than I, then codes belonging to a following instruction are read, said reading means comprising
      address means for applying to said memory banks individual addresses generated from a collective value of a program counter that is incremented, before a beginning of the cycle for reading the instruction, by a value equal to a number of codes belonging to a previous instruction, and applying to each of said memory banks an individual read address that is based upon a result of a division by I of the collective value of the program counter, the individual read address for each respective memory bank being equal to P0 or P0±1, with P0 being a quotient of the division by I of the collective value of the program counter, and
      filtering means for filtering codes that do not belong to the instruction to be read, while using parallel bits accompanying the codes.

2. A signal processor according to claim 1, wherein said address means comprises applying, to an ix ranking memory bank, an address equal to P0 when ix is greater than R and an address equal to P0+1 when ix is less than or equal to R, with R being a remainder of the division by I of the value of the program counter.

3. A signal processor according to claim 1, wherein said reading means comprises reorganization means for reorganizing codes of a sequence of codes read in said program memory according to an algorithm defined as follows:

$$c'(j)=c(ix), \text{ with } ix=(j+R') \text{ modulo } I,$$

and with ix and j designating a ranking of the codes before and after reorganization, c(ix) designating ix as the ranking of the codes before reorganization, c'(j) designating j as the ranking of the codes after reorganization, and R' is a remainder of a division by I of a value that was shown by the program counter during a previous clock cycle.

4. A signal processor according to claim 3, wherein said reorganization means applies to the codes of the sequence of codes read a circular permutation comprising a number of circular permutations equal to R' or to I–R', depending on a direction of the circular permutation made.

5. A signal processor according to claim 4, wherein said reorganization means comprises a barrel shifter having a control input for receiving the parameter R'.

6. A signal processor according to claim 1, wherein the filtered codes are replaced by no-operation codes.

7. A signal processor according to claim 6, wherein said filtering means executes an algorithm defined as follows:

For j=0, $val(j=0)=v;$ $s(j=0)=c'(j=0);$

For j going from 1 to I, $val(j)=v$ if $val(j-1)=v$ and if parallel bits of $c'(j)=p,$ else $val(j-1)=/v;$ $s(j)$ $c'(j)$ if $val(j)=v;$ $s(j)=NOP$ if $val(j)=/v;$ with val(j) being a validation term associated with each j ranking code, c'(j) is capable of having two values v and /v, s(j) designates j ranking outputs of said filtering means corresponding to same ranking inputs receiving a code c'(j), and NOP indicates a no-operation code.

8. A signal processor according to claim 7, wherein said reading means comprises at least one parallel-connected RISC type execution unit for receiving non-filtered codes.

9. A processor for executing variable-sized instructions, each instruction comprising up to N codes with N being a positive integer greater than 1, the processor comprising:
   a memory comprising I individually addressable, parallel-connected memory banks with I being a positive integer at least equal to N, said memory comprising a program recorded in an interlaced fashion; and
   a reading circuit for reading said memory by reading a code in each of said I memory banks during a cycle for reading an instruction, with each instruction comprising a sequence of codes to be read and when a number of the sequence of codes of the instruction being read is less than I, then codes belonging to a following instruction are read, said reading circuit comprising
      an address circuit for applying to said memory banks individual addresses generated from a collective value of a program counter that is incremented, before a beginning of the cycle for reading the instruction, by a value equal to a number of codes belonging to a previous instruction, and applying to each of said memory banks an individual read address that is based upon a result of a division by I of the collective value of the program counter, a filtering circuit for filtering codes that do not belong to the instruction to be read, while using parallel bits accompanying the codes, and a reorganization circuit for reorganizing codes of a sequence of codes read in said memory according to an algorithm defined as follows:

$c'(j)=c(ix)$, with $ix=(j+R')$ modulo $I$, and with ix and j designating a ranking of the codes before and after reorganization, c(ix) designating ix as the ranking of the codes before reorganization, c'(j) designating j as the ranking of the codes after reorganization, and R' is a remainder of a division by I of a value that was shown by the program counter during a previous clock cycle.

10. A processor according to claim 9, wherein the program is recorded as a function of one code per memory bank and per address applied to said memory banks.

11. A processor according to claim 9, wherein the individual read address for each respective memory bank is equal to P0 or P0+1, with P0 being a quotient of the division by I of the collective value of the program counter.

12. A processor according to claim 11, wherein said address circuit comprises applying, to an ix ranking memory bank, an address equal to P0 when ix is greater than R and an address equal to P0+1 when ix is less than or equal to R, with R being a remainder of the division by I of the value of the program counter.

13. A processor according to claim 9, wherein the filtered codes are replaced by no-operation codes.

14. A processor according to claim 13, wherein said filtering circuit executes an algorithm defined as follows:

For j=0, val(j=0)=v, s(j=0)=c'(j=0);

For j going from 1 to I, val(j)=v if val(j−1)=v and if parallel bits of c'(j)=p, else val(j−1)=v;

s(j) c'(j) if val(j)=v;

s(j)=NOP if val(j)=/v, with val(j) being a validation term associated with each j ranking code, c'(j) is capable of having two values v and /v, s(j) designates j ranking outputs of said filtering circuit corresponding to same ranking inputs receiving a code c'(j), and NOP indicates a no-operation code.

15. A processor according to claim 14, wherein said reading circuit comprises at least one parallel-connected RISC type execution unit for receiving non-filtered codes.

16. A method for reading variable-sized instructions in a signal processor, with each instruction comprising up to N codes with N being a positive integer greater than 1, the method comprising:

providing a program memory comprising I individually addressable, parallel-connected memory banks with I being a positive integer at least equal to N;

recording codes of a program in the program memory in an interlaced fashion as a function of one code per bank and per address applied to the memory bank;

applying, to the memory banks, individual addresses generated from a collective value of a program counter that is incremented, before a beginning of the read cycle for the instruction, by a value equal to a number of codes contained in a previous instruction, and applying to each of the memory banks an individual read address that is based upon a result of a division by I of the collective value of the program counter, with the individual read address for each respective memory bank being equal to P0 or P0+1, with P0 being a quotient of the division by I of the collective value of the program counter; and during a read cycle of an instruction, with each instruction comprising a sequence of codes to be read, reading the sequence of codes and when a number of the sequence of codes read is less than I, then reading codes belonging to a following instruction; and filtering codes read that do not belong to the instruction, while using parallel bits accompanying the codes.

17. A method according to claim 16, further comprising applying, to an ix ranking memory bank, an address equal to P0 when ix is greater than R and an address equal to P0+1 when ix is less than or equal to R, with R being a remainder of the division by I of the value of the program counter.

18. A method according to claim 16, further comprising reorganizing codes of the sequence of codes read in the program memory according to an algorithm defined as follows:

$c'(j)=c(ix)$, with $ix=(j+R')$ modulo $I$, and with ix and j designating a ranking of the codes before and after reorganization c(ix) designating ix as the ranking of the codes before reorganization c'(j) designating j as the ranking of the codes after reorganization and R' is a remainder of a division by I of a value that was shown by the program counter during a previous clock cycle.

19. A method according to claim 16, wherein the filtered codes are replaced by no-operation codes.

20. A method according to claim 19, wherein the codes are filtered according to an algorithm defined as follows:

For j=0, val(j=0)=v, s(j=0)=c'(j=0);

For j going from 1 to I, val(j)=v if val(j−1)=v and if parallel bits of c'(j)=p, else val(j−1)=v;

s(j) c'(j) if val(j)=v;

s(j)=NOP if val(j)=/v, with val(j) being a validation term associated with each j ranking code, c'(j) is capable of having two values v and /v, s(j) designates j ranking outputs of the filtering corresponding to same ranking inputs receiving a code c'(j), and NOP indicates a no-operation code.

21. A method according to claim 20, wherein non-filtered codes are sent to parallel-connected RISC type execution units.

22. A method for reading variable-sized instructions in a processor, with each instruction comprising up to N codes with N being a positive integer greater than 1, the processor comprising a memory comprising I individually addressable, parallel-connected nemory banks, with I being a positive integer at least equal to N, the method comprising:

recording codes of a program in the memory in an interlaced fashion;

applying, to the memory banks, individual addresses generated from a collective value of a program counter that is incremented, before a beginning of the read cycle for the instruction, by a value equal to a number of codes contained in a previous instruction, and applying to each of the memory banks an individual read address that is based upon a result of a division by I of the collective value of the program counter;

during a read cycle of an instruction, with each instruction comprising a sequence of codes to be read, reading the sequence of codes and when a number of the sequence of codes read is less than I, then reading codes belonging to a following instruction;

filtering codes read that do not belong to the instruction, while using parallel bits accompanying the codes; and reorganizing codes of the sequence of codes read in the memory according to an algorithm defined as follows:

$$c'(j)=c(ix), \text{ with } ix=(j+R')\text{modulo } I,$$

and with ix and j designating a ranking of the codes before and after reorganization, c(ix) designating ix as the ranking of the codes before reorganization, c'(j) designating j as the ranking of the codes after reorganization, and R' is a remainder of a division by I of a value that was shown by the program counter during a previous clock cycle.

23. A method according to claim 22, wherein the program is recorded as a function of one code per bank and per address applied to the memory banks.

24. A method according to claim 22, wherein the individual read address for each respective memory bank is equal to P0 or P0+1, with P0 being a quotient of the division by I of the collective value of the program counter.

25. A method according to claim 24, further comprising applying, to an ix ranking memory bank, an address equal to P0 when ix is greater than R end an address equal to P0+1 when ix is less than or equal to R, with R being a remainder of the division by I of the value of the program counter.

26. A method according to claim 22, the filtered codes are replaced by no-operation codes.

27. A method according to claim 26, wherein the codes are filtered according to an algorithm defined as follows:

For $j=0$, $\text{val}(j=0)=v$, $s(j=0)=c'(j=0)$;

For j going from 1 to I, $\text{val}(j)=v$ if $\text{val}(j-1)=v$ and if parallel bits of $c'(j)=p$, else $\text{val}(j-1)=v$;

$s(j)$ $c'(j)$ if $\text{val}(j)=v$;

$s(j)=\text{NOP}$ if $\text{val}(j)=/v$;

with val(j) being a validation term associated with each j ranking code, c'(j) is capable of having two values v and /v, s(j) designates j ranking outputs of the filtering corresponding to same ranking inputs receiving a code c'(j), and NOP indicates a no-operation code.

28. A method according to claim 27, wherein non-filtered codes are sent to parallel-connected RISC type execution units.

* * * * *

UNITED STATES PATENT AND TRADEMARK OFFICE
CERTIFICATE OF CORRECTION

PATENT NO. : 6,944,748 B2
DATED : September 13, 2005
INVENTOR(S) : Sanches et al.

It is certified that error appears in the above-identified patent and that said Letters Patent is hereby corrected as shown below:

Column 1,
Line 39, delete "UE1", insert -- EU1 --.

Column 2,
Line 11, delete "is object", insert -- is the object --.

Column 3,
Line 38, delete "when i less", insert -- when i is less --.

Column 4,
Line 34, delete "each to the", insert -- each of the --.

Column 9,
Line 15, delete "c'(0)-c'(3)", insert -- c(0)-c(3) --.

Column 12,
Line 38, delete "else val(j-1)=v;", insert -- else val(j-1)=/v; --.

Column 13,
Line 51, delete "else val(j-1)=v;", insert -- else val(j-1)=/v; --.

Column 14,
Line 6, delete "bank;", insert -- banks; --.
Line 40, delete "after reorganization c(ix)", insert -- after reorganization, c(ix) --.
Line 41, delete "before reorganization c'(j)", insert -- before reorganization, c'(j) --.
Line 61, delete "else val(j-1)=v;", insert -- else val(j-1)=/v; --.

Column 15,
Line 11, delete "nemory", insert -- memory --.

UNITED STATES PATENT AND TRADEMARK OFFICE
CERTIFICATE OF CORRECTION

PATENT NO. : 6,944,748 B2
DATED : September 13, 2005
INVENTOR(S) : Sanches et al.

It is certified that error appears in the above-identified patent and that said Letters Patent is hereby corrected as shown below:

Column 16,
Line 10, delete "end", insert -- and --.
Line 13, delete "claim 22, the", insert -- claim 22, wherein the --.
Line 28, delete "else val(j-1)=v;", insert -- else val(j-1)=/v; --.

Signed and Sealed this

Twenty-first Day of March, 2006

JON W. DUDAS
*Director of the United States Patent and Trademark Office*